United States Patent
Bhattacharyya et al.

(10) Patent No.: US 9,330,365 B2
(45) Date of Patent: May 3, 2016

(54) METHOD AND SYSTEM FOR ESTIMATING SIZE AND EFFORT OF SOFTWARE ASSURANCE PROJECTS

(71) Applicant: Tata Consultancy Services Limited, Mumbai (IN)

(72) Inventors: Pranabendu Bhattacharyya, Kolkata (IN); Sanghamitra Ghosh Basu, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 268 days.

(21) Appl. No.: 13/686,587

(22) Filed: Nov. 27, 2012

(65) Prior Publication Data

US 2014/0089887 A1    Mar. 27, 2014

(30) Foreign Application Priority Data

Sep. 27, 2012   (IN) .......................... 2848/MUM/2012

(51) Int. Cl.
*G06F 9/44* (2006.01)
*G06Q 10/06* (2012.01)
*G06F 11/36* (2006.01)

(52) U.S. Cl.
CPC .............. *G06Q 10/06* (2013.01); *G06F 11/368* (2013.01); *G06F 11/3676* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 2005/0166094 A1* | 7/2005 | Blackwell et al. | 714/38 |
| 2005/0210442 A1 | 9/2005 | Seetharaman | |
| 2008/0092120 A1* | 4/2008 | Udupa et al. | 717/124 |
| 2009/0228261 A1 | 9/2009 | Chulani | |
| 2010/0131314 A1 | 5/2010 | Lo Yuk Ting | |

OTHER PUBLICATIONS

Swarnalatha Nithiyanandam, Poorani Sathiamurthy and Vinutha Rao / Mindteck "Improving Test Estimation Accuracy using Test Point", 2012.

(Continued)

*Primary Examiner* — Brian W Wathen
*Assistant Examiner* — Deric Ortiz
(74) *Attorney, Agent, or Firm* — Schmeiser, Olsen & Watts LLP

(57) ABSTRACT

A method and system is provided for estimating size and effort of software assurance project for distributing the estimated effort across the software assurance project phases. Particularly, the invention provides a method and system for estimating the software assurance project size based on the predefined weight ratios assigned to the test cases after classifying them into simple, medium and complex categories. Further, the invention provides a method and system for utilizing the estimated software assurance project size and organizational baseline productivity information for estimating the software assurance efforts. Further, the invention provides a method and system for distributing the estimated effort across the software assurance project phases.

14 Claims, 4 Drawing Sheets

(56) References Cited

OTHER PUBLICATIONS

Parthasarathy, M.A., Infosys Lab, "Practical Software Estimation: Function Point Methods for Insourced and Outsourced Projects", Chapter 7: "Size, Effort, and Scheduling of Projects", 2007.

Vu Nguyen / University of Southern California "Improved size and effort estimation models for software maintenance", Dec. 2010.

Brian Driscoll /Drexel University "Software Size and Effort Estimation"; http://www.scribd.com/doc/42669896/Software-Size-and-Effort-Estimation-An-exploration-of-algorithmic-and-non-algorithmic-techniques; Nov. 8, 2010.

S.Malathi and Dr.S.Sridhar, Sathyabama University, Chennai, India/ Indian Journal of Computer Science and Engineering (IJCSE) "Analysis of Size Metrics and Effort Performance Criterion in Software Cost Estimation", Feb.-Mar. 2012, vol. 3 No. 1.

* cited by examiner

METHOD AND SYSTEM FOR ESTIMATING SIZE AND EFFORT OF SOFTWARE ASSURANCE PROJECTS

CROSS REFERENCE TO RELATED APPLICATION[S]

This application claims priority to Indian Patent Application to Bhattacharyya et al., serial number 2848/MUM/2012, filed Sep. 27, 2012, the disclosure of which is hereby incorporated entirely herein by reference.

FIELD OF THE INVENTION

The invention generally relates to the field of software estimation. More particularly, the invention relates to a method and system for estimating size and effort of software testing or assurance projects, adjusting of such efforts on a plurality of variable factors and further distribution of the estimated effort across the software assurance project phases.

BACKGROUND OF THE INVENTION

Software estimation is the process of arriving at the most probable size and eventually effort that would be required to maintain/configure/test any software application or product. The input (requirements) available for the estimation drives accuracy of the estimates. This effort estimation may be used as input to derive project plans, create budgets, decide on investments, pricing processes and bidding for projects. Estimation of software assurance projects involves size, effort and schedule estimation of testing activities (e.g., system testing, integration testing, user acceptance testing) taking input as test cases/requirements etc based on its availability.

While estimating Software effort, various techniques are known for size estimation of assurance projects (both manual and test automation). Generally, size for manual testing is estimated in terms of normalized test cases (derived or predicted from size in Function Point/SLOC). Whereas, for effort estimation various crude techniques like proportion of development effort or even bottom up approach of WBS are employed, which many a times are not reliable, resulting into improper effort distribution. One of the most reliable methods of effort estimation is a risk-based method that determines objects for testing and an extent of testing depending on use of historical data along with predefined industry standards.

In addition, the limitation of all previous techniques described in prior art relating to estimation of software testing or assurance projects is that each test case that is considered for testing in order to estimate efforts in software assurance projects, can be categorized based on assigning weightage to specific parameters. Wherein such parameters may include number of steps, data, operations performed etc. In particular, the existing prior art patent application US20080092120 by Udupa et al. disclose size and effort estimation in testing applications, wherein the size of a software application testing project is determined, and person/hours required for the testing project is estimated. The US20080092120 by Udupa et al. disclose one-dimensional and person dependent categorization of each test case that is considered for testing is essentially based on assigning weightage to specific parameters such as number of steps, data, operations performed etc. Based on the weightage assigned to each of these parameters, the test cases can be allocated 'points' and a size in terms of test units is derived.

To ensure project/program success, increase overall product quality and improve time to market of the product, it may be imperative that the approach for estimating software test effort be multi-dimensional, person independent and as accurate as possible. In view of the above mentioned limitations of the techniques available in the prior art, there is a lack of structured and scientific methods for estimating software testing size and effort and further distributing estimated efforts among corresponding phases of the project.

There exists a need for a multi-dimensional, process oriented and person in-dependant approach wherein test cases are not only categorized based on weightage assigned to such parameters but also consider the need for categorizing test cases based on the fact that out of a finite set of test cases in a given testing project for consideration, wherein the given finite set of test cases could include to be used as it is, some would need modifications and some new test cases would need to be created.

In light of the above mentioned unreliable effort computation techniques, there exists a need for an adaptive method and system that is responsive to various variables in an application testing, such that an accurate size and effort estimation of software assurance projects and further distribution of the estimated efforts among the various life cycle phases is ensured. In addition to this, there is also a need for a method and system that minimizes inputs required for estimation, improves reusability of historical estimates, reduces turnaround time for estimation and is able to derive effort from the estimated size.

OBJECTS OF THE INVENTION

The principal object of the present invention is to provide a multidimensional person independent system and method with predefined guidance for estimating size and effort of software assurance or testing projects, adjusting the estimated effort on the basis of certain project, domain or geographic specific factors and further distribution of estimated effort across software assurance project phases.

Another object of the present invention is to provide a method and system for classifying test cases of the software assurance project based on a two dimensional categorization of Test Case Type (newly created, modified, existing) and Test Case Complexity (simple, average, complex) and assigning specified weight ratio to classified test cases across both dimensions for estimating project size.

Another object of the present invention is to provide a method and system for estimating project effort of the software assurance project based on the estimated project size and organizational baseline productivity (OBP).

Yet another object of the invention is to provide a method and system for allowing reusability of historical estimates and quick turnaround time.

SUMMARY OF THE INVENTION

Before the present method, system, and hardware enablement are described, it is to be understood that this invention in not limited to the particular systems, and methodologies described, as there can be multiple possible embodiments of the present invention which are not explicitly illustrated in the present disclosure. It is also to be understood that the terminology used in the description is for the purpose of describing the particular versions or embodiments only, and is not intended to limit the scope of the present invention.

The present invention discloses a multidimensional person independent with predefined guidance system and method for estimating size and effort of software testing or assurance project, adjusting the estimated effort on the basis of presence of certain project, domain or geographic specific factors and further distribution of estimated effort across software testing or assurance project phases.

In one aspect of the present invention, a method is provided for classifying a set of test cases of the software testing or assurance project across two dimensions viz. Test case type, comprising newly created test cases, modified test cases, and existing test cases and Test case complexity, wherein the test cases may be simple average and complex. Further a predefined specified weight ratio is assigned to said classified test cases across both these dimensions. Project size is then estimated in Normalized Test Cases (NTC) based on the assigned weight ratio, wherein estimating project effort of the software testing or assurance project is based on the estimated project size and organizational baseline productivity (OBP). Further, an adjusted estimated effort is derived on the basis of presence of certain project, domain or geographic specific factors, further to which estimated effort is distributed across software testing or assurance project phases.

In one aspect of the present invention a system is provided for estimating size and effort of software testing or assurance project, the system comprises a test case classification module adapted for classifying a set of test cases of the software testing or assurance project across two dimensions viz. Test case type, comprising newly created test cases, modified test cases, and existing test cases and Test case complexity, wherein the test cases may be simple average and complex. A test case weight assignment module adapted for assigning a predefined specified weight ratio to said classified test cases across both these dimensions. A test case size estimation module adapted for estimating project size in Normalized Test Cases (NTC) based on the assigned weight ratio. An effort estimation module adapted for estimating project effort of the software assurance project based on the estimated project size and organizational baseline productivity (OBP). An effort adjustment module adapted for adjusting the estimated effort depending on certain project, domain or geographic specific factors. An effort distribution module adapted for distributing the estimated effort across the software testing or assurance project phases and an organization knowledge base adapted for storing information pertaining to the organizational baseline productivity (OBP) and estimation data.

BRIEF DESCRIPTION OF DRAWINGS

The foregoing summary and the detailed description of preferred embodiments of the present inventions are better understood when read in conjunction with the appended drawings. For the purpose of explaining the invention, drawings with associated labels have been constructed. However, the invention is not limited to the specific methods and apparatus disclosed in the drawings.

DETAILED DESCRIPTION OF THE INVENTION

Figure 1:
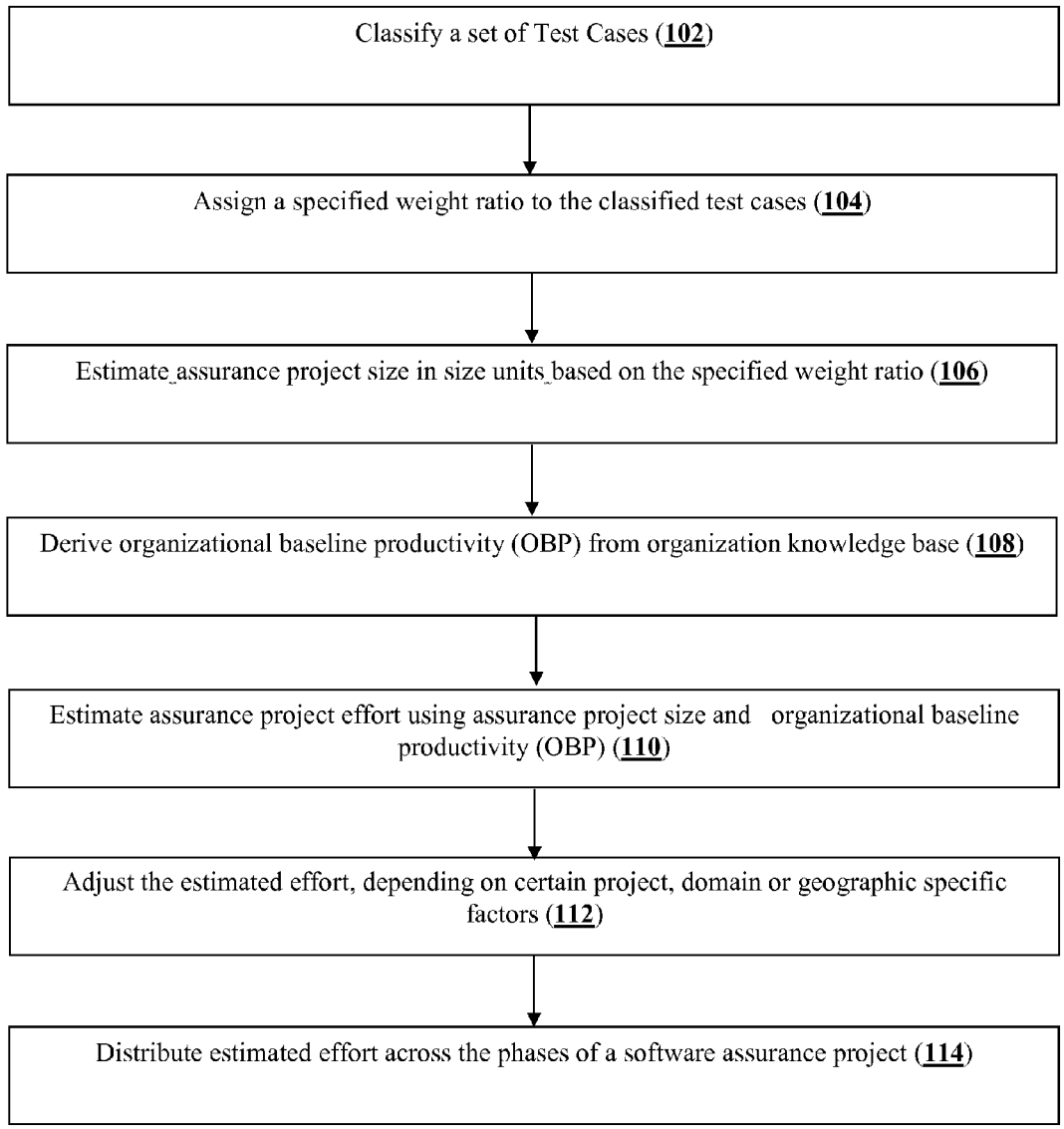
FIG. 1: shows a process overview flow diagram of a method and system for estimating size and effort of software assurance project for effort distribution.

Some embodiments of this invention, illustrating its features, will now be discussed:

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described. The disclosed embodiments are merely exemplary of the invention, which may be embodied in various forms.

The disclosed embodiments are merely exemplary of the invention, which may be embodied in various forms.

The existing effort estimation techniques for software assurance projects are unreliable due to one dimensional view of the test cases, which don't take into consideration the fact that that in a given testing project a given finite set of test cases would already be available to the testing team, out of which some would be used as-is, some would need modifications. Apart from this some new test cases would also need to be created. The person dependent estimation model is provided with little or no predefined guidance on different factors contributing to the test case complexity.

The current invention seeks to address these challenges and a computation model is configured to receive input of the test cases, apply computational processing thereto the input test cases and applying certain factors that are internal as well as external to software testing to derive a statistically and physically realistic effort computation The size is derived based on a plurality of test steps for a plurality of test cases of software assurance projects using a project size estimation module (302). The effort of the software assurance project is estimated based on the derived project size in Normalized Test Cases (NTC) and a baseline productivity using an effort estimation module (304). The project effort of the software assurance project is adjusted based on a plurality of adjustment factors using an effort adjustment module (306). Finally, the adjusted effort is distributed across the software assurance project phases using an effort distribution module (308).

The present invention provides a system for estimating size and effort for one or more software assurance projects, and further distributing derived estimated effort across a plurality of phases of the software assurance project. The system comprising of a test case classification module (402) is adapted for classifying a set of test cases of the software assurance project. A test case weight assignment module (404) is adapted for assigning a specified weight ratio to the classified test cases. A project size estimation module (302) is adapted for estimating project size in test cases based on the assigned weight ratio. An effort estimation module (304) is adapted for estimating project effort of the software assurance project based on the estimated project size and organizational baseline productivity (OBP). An effort adjustment module (306) is adapted for adjusting the derived effort based on a plurality of adjustment factors influencing software assurance projects including and not limited to Project Specific factors, Geographic factors and Domain Specific factors. An effort distribution module (310) is adapted for distributing the estimated effort across a plurality of phases of the software assurance project. An organization knowledge base (310) adapted for storing information pertaining to the baseline productivity or organizational baseline productivity (OBP).

Referring to FIG. 1, which is a process overview diagram of a method and system for estimating size and effort of software assurance project for effort distribution.

The process starts at step 102, a set of test cases are classified across two dimensions into nine distinct categories against a predefined guidance. In the first dimension, the plurality of test cases, existing or newly created are classified into at least one of a simple, medium and complex category based on the number of test steps. In the second dimension, the previously classified test cases are further categorized, into existing test cases that can be used as-is, existing test cases that are planned to be modified in the current release, and new test cases planned to be created for the current release. At step 104, in the third dimension, a pre-defined weightage are applied across the first dimension and second dimension to express test cases into equivalent normalized test cases. At step 106, the software assurance project size is estimated in terms of Normalized Test Cases based on the assigned specified weight ratios. The estimation of project effort of the software assurance project is based on the estimated project size and organizational baseline productivity (OBP), wherein the organizational baseline productivity (OBP) is derived using statistical techniques using data from similar projects that have been executed in the past. The organizational baseline productivity (OBP) is set of historical evidence gleaned from the actual effort consumed by similar projects and arriving at individual productivities, which equals project size divided by the total efforts, of these projects. At step 108, organizational baseline productivity is derived from the organization's own knowledge base. Wherein, organisation's own historical data for projects with similar characteristics such as technologies, business and tools used are also be referred to for calculating productivity for more accurate estimates. At step 110, the software assurance project effort is estimated using the estimated project size and organizational baseline productivity as an input. At step 112, the estimated effort is adjusted, depending on certain project, domain or geographic specific factors. The process ends at step 114, in which the estimated software assurance project effort is distributed across the software testing or assurance project phases.

Figure 2:
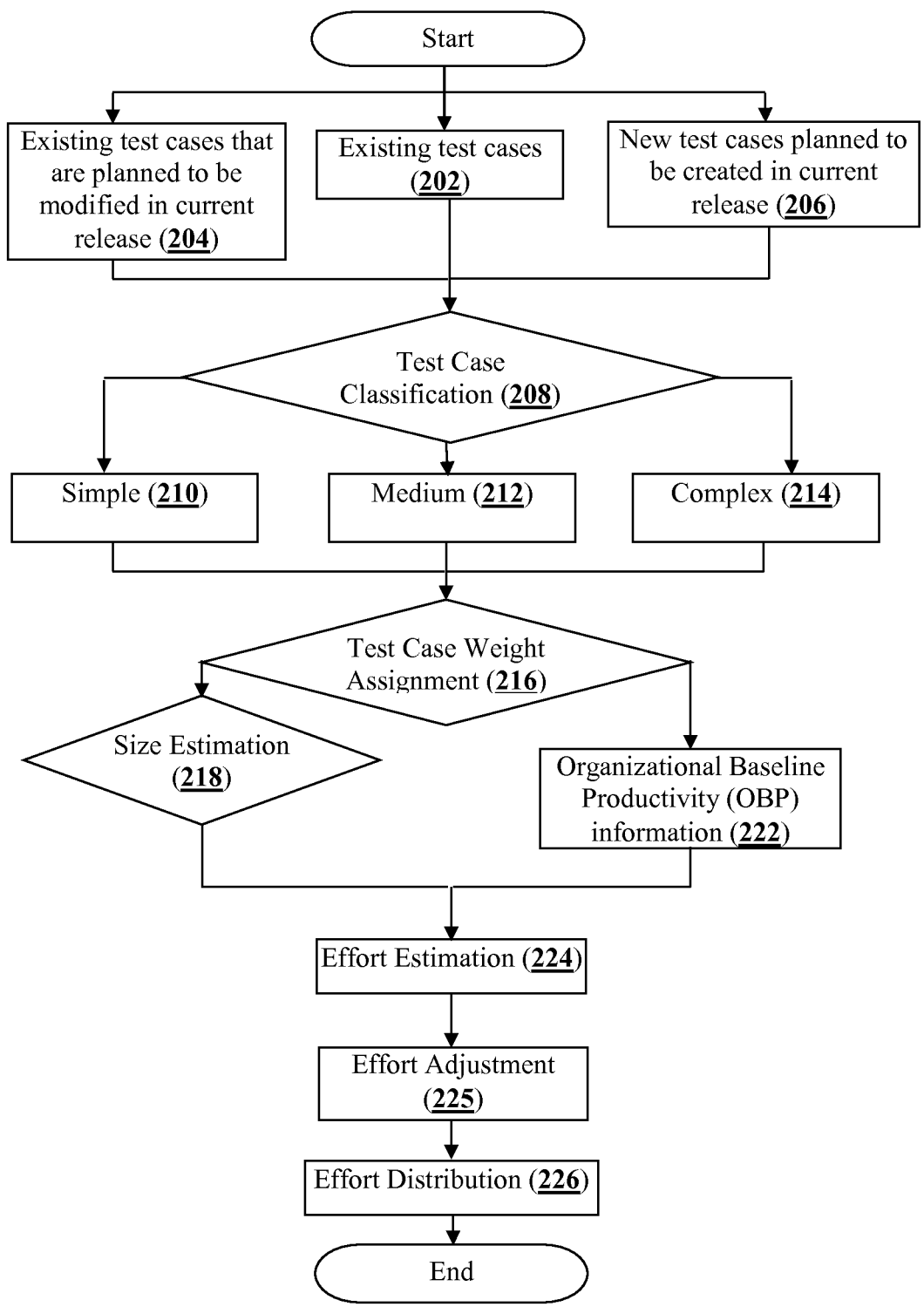
FIG. 2: shows a detailed process overview diagram of a method and system for estimating size and effort of software assurance project for effort distribution.

Referring to FIG. 2 is a detailed process overview diagram of a method and system for estimating size and effort of software assurance project for effort distribution.

The process of size and effort estimation of software assurance project starts by inputting the set of test cases of the software assurance project which may be selected from the group comprising of existing regression test cases 202, existing regression test cases that are planned to be changed in the current release 204, and new test cases planned to be created for the current release 206. At the step 208, the inputted test cases are classified into simple 210, medium 212 and complex 214 categories on the basis of the number of steps that will have to be executed in order to complete the test case. Wherein, if the number of test steps is upto 10 complexity of the test case is considered to be simple 210, when the number of test steps is in between 11 to 20, the complexity of the test case is considered to be medium 212 and when the number of test steps is in between 21 to 30 complexity of the test case is considered to be complex 214. When the number of steps in a test case exceeds 30, the test case is broken down into a plurality of test cases having complexities of complex (214) and a combination of complexities simple (210) and medium (212). The test step in the test case may be any test step with a predefined execution time. The test step execution time may be but not limited to 2 minutes. At step (216), the classified test cases are assigned with the specified weight ratio. The specified weight ratio assigned to the classified test cases are predefined weight ratio of 1:2:3 for simple, average, and complex category of the set of test cases of the software assurance project respectively. At the step 218, the software assurance project size is estimated in terms of Normalized Test Cases (NTC). At the step 222, the organizational baseline productivity information is derived from the organizations own knowledge using organization knowledge base (312). At the step 224, the software assurance project effort is estimated based on the step 218 and step 222, wherein the software assurance project size is and the organizational baseline productivity information is utilized to estimate assurance project effort. The effort thus derived is adjusted based on various factors that influence software assurance projects in step 225.

The adjustment factors affecting effort estimation may include Project Management (Strategy, Planning, Monitoring and Reporting), Quality Assurance and Retesting, Reworking & Defect Tracking and the project specific characteristics that directly influence on estimated efforts like Team's business Experience, Team's Technology Experience/New Technology, Tools used, Quality of Development/Unit level Testing, Quality of Input documentation/Test Basis, Development environment, Test environment, Availability of Testware, External dependencies, Communication, Multi site Multi time Zone, Volatile Requirement, Availability of SME, Delay in Client Response, Infrastructure support, Large Data Volume, Resource Unavailability, System response time depending on links etc and Test Report Analysis.

The process ends at step 226, wherein the estimated software assurance project effort is distributed across the software assurance project phases.

Figure 3:
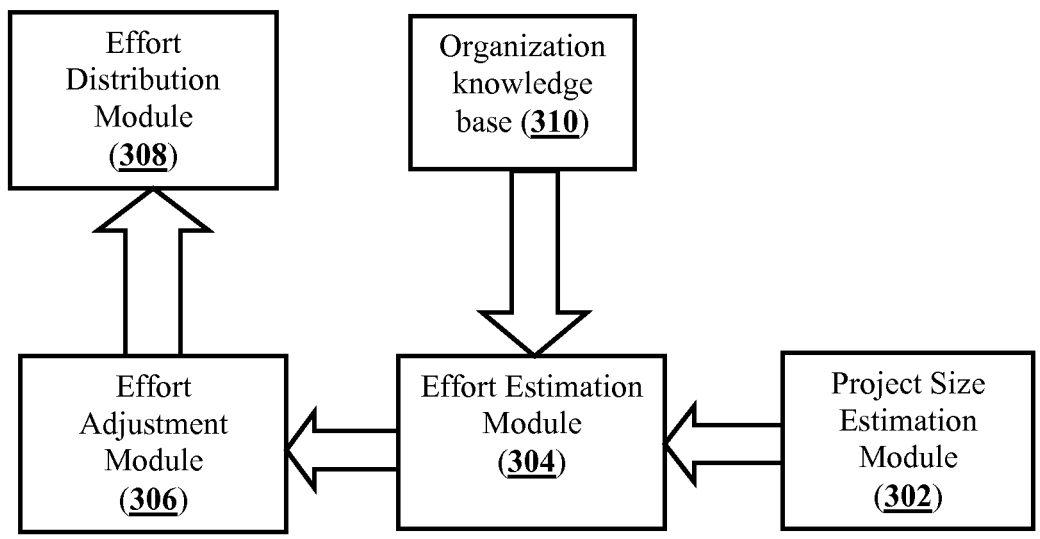
FIG. 3: shows a system diagram illustrating the workflow for estimating size and effort of software assurance project for effort distribution.

Referring to FIG. 3 is a system diagram illustrating the workflow of estimating size and effort of software assurance project for effort distribution.

In an embodiment of the invention, the system (300) for size and effort estimation of software assurance projects for estimated effort distribution across software assurance project phases comprising a project size estimation module (302), an effort estimation module (304), an effort adjustment module (306) and an effort distribution module (308) and an organization knowledge base (310).

The system and method for estimating size and effort of software assurance projects and further distribution of the estimated effort across software assurance project phases is described. It should be noted that following discussion only illustrates one of the procedures to be used. These procedure may need some modification, some parts may be added, removed or the process may be used iteratively while actual use. Some of the steps may involve offline work to be carried out. The information is then retrieved for use during actual operation of the presented system and method. Similarly, the test cases may be selected form the group comprising of existing regression test cases, existing regression test cases that are planned to be changed in the current release, and new test cases planned to be created for the current release, and then the test cases may be retrieved for use during actual operation of the presented system and method.

In an exemplary embodiment of the present invention, the inputs required for deriving the size of a manual testing project may be considered as existing manual regression test cases, existing manual regression test cases that are planned to be changed in the current release and new manual test cases planned to be created for the current release.

In an exemplary embodiment of the present invention, the inputs required for deriving size of a test automation project may be existing automated test cases (a), existing automated test cases that may be planned to be changed in the current release (b), new automated test cases planned to be created for the current release (c) and percentage of automation scripts that may be reused as a result of the framework chosen usually estimated to be 10%.

In an exemplary embodiment of the present invention, the classification may be based on additional parameters to arrive at the complexity of the test cases. This classification may be relative to the release and project at hand and cannot be standardized across projects. One of the thumb rules which may be applied while classifying is to order the test cases on the basis of complexity, and classify the top 30% most complex requirements as "Complex", middle 40% requirements as "Medium", and bottom 30% requirements as "Simple".

In an embodiment of the invention, the project size estimation module (302) is adapted to estimate the software assurance project size in terms of Normalized Test Cases.

In an embodiment of the invention, for manual testing projects, the organization knowledge base (310) is adapted to store the organisation's own historical data for projects with similar characteristics for example, technologies, business and tools used, may also be referred to for arriving at the productivity figures for more accurate estimates.

In an exemplary embodiment of the present invention, for test automation projects, organizational baseline productivity (OBP) or baseline productivity is based on the automation tool being used; for instance Win Runner, Quality Test Professional or QTP, Rational Functional Tester and the like.

In an exemplary embodiment of the present invention, in case OBP is not available for the testing type (manual testing) or testing tool (automation testing) identified, industry benchmark productivity data (if available) may be used for calculating the base effort.

In an exemplary embodiment of the present invention, the OBP may be derived by gathering the actual effort consumed by similar projects and arriving at individual productivities, which equals application size divided by the total efforts, of these projects. Statistical methods are used to arrive at the overall organizational productivity. OBP for testing projects are dependent on Application testing Methodology, Type of engagement like IT transformation or Development and Platform. For automation assurance projects the testing tool used is also a parameter.

In an embodiment of the invention, the effort estimation module (304) is adapted for estimating software assurance projects efforts. The estimation of the effort is based on the information received from the project size estimation module (302) and the organization knowledge base (310).

In an embodiment of the present invention, the base effort in Person Hours (PH) for manual test cases may be calculated as:

Base Effort=Number of Normalized Test cases/productivity (in Normalized Test cases per PH)

In an embodiment of the present invention, the base effort in Person Hours (PH) for automated test cases may be calculated as:

Base Effort=Number of Normalized Test script/productivity (in Normalized Test scripts per PH)

In an exemplary embodiment of the present invention, the effort derived using productivity may be treated as the base effort. The effort adjustment module (306) is adapted to adjust the derived base effort based on information regarding other effort affecting factors that influence this base effort and result into an adjusted effort.

In an exemplary embodiment of the present invention, the effort adjustment module (306) is adapted to adjust the derived effort by compensating the estimated effort using the plurality of adjustment factors selected from a group of a Project Specific factors, a Geography Specific Factors, a Domain Specific Factors, a team's experience on test automation tool training requirements, an additional delays due to test environment setup, a quality of input documentation and integrate Test Scripts with Test Management Tool Scripts.

In an exemplary embodiment of the present invention, the factors affecting effort estimation may be such as Project Management (Strategy, Planning, Monitoring and Reporting), Quality Assurance and Retesting, Reworking & Defect Tracking and the project specific characteristics that directly influence on estimated efforts like Team's business Experience, Team's Technology Experience/New Technology, Tools used, Quality of Development/Unit level Testing, Quality of Input documentation/Test Basis, Development environment, Test environment, Availability of Testware, External dependencies, Communication, Multi site Multi time Zone, Volatile Requirement, Availability of SME, Delay in Client Response, Infrastructure support, Large Data Volume, Resource Unavailability, System response time depending on links etc and Test Report Analysis.

In an embodiment of the invention, the effort distribution module (308) is adapted to distribute the estimated software assurance project effort the software assurance project phases.

In an exemplary embodiment of the present invention, the phases may be as per the standard testing phases, or they may be customized, based on the project requirements.

In an exemplary embodiment of the present invention, the manual testing projects may be classified into four major phases. The phases may be test planning covering requirement analysis effort; test design covering manual scripting and data preparation effort; test execution covering the core actual test execution effort and the test completion covering analysis and reporting.

In an exemplary embodiment of the present invention, the test automation projects may be classified into four major phases. The phases may be test automation planning covering requirement analysis effort; test automation design covering correction or redesign of test cases and test data setup for automation; test automation construction covering the core construction (script) effort and the test automation execution covering execution, analysis and reporting.

Figure 4:
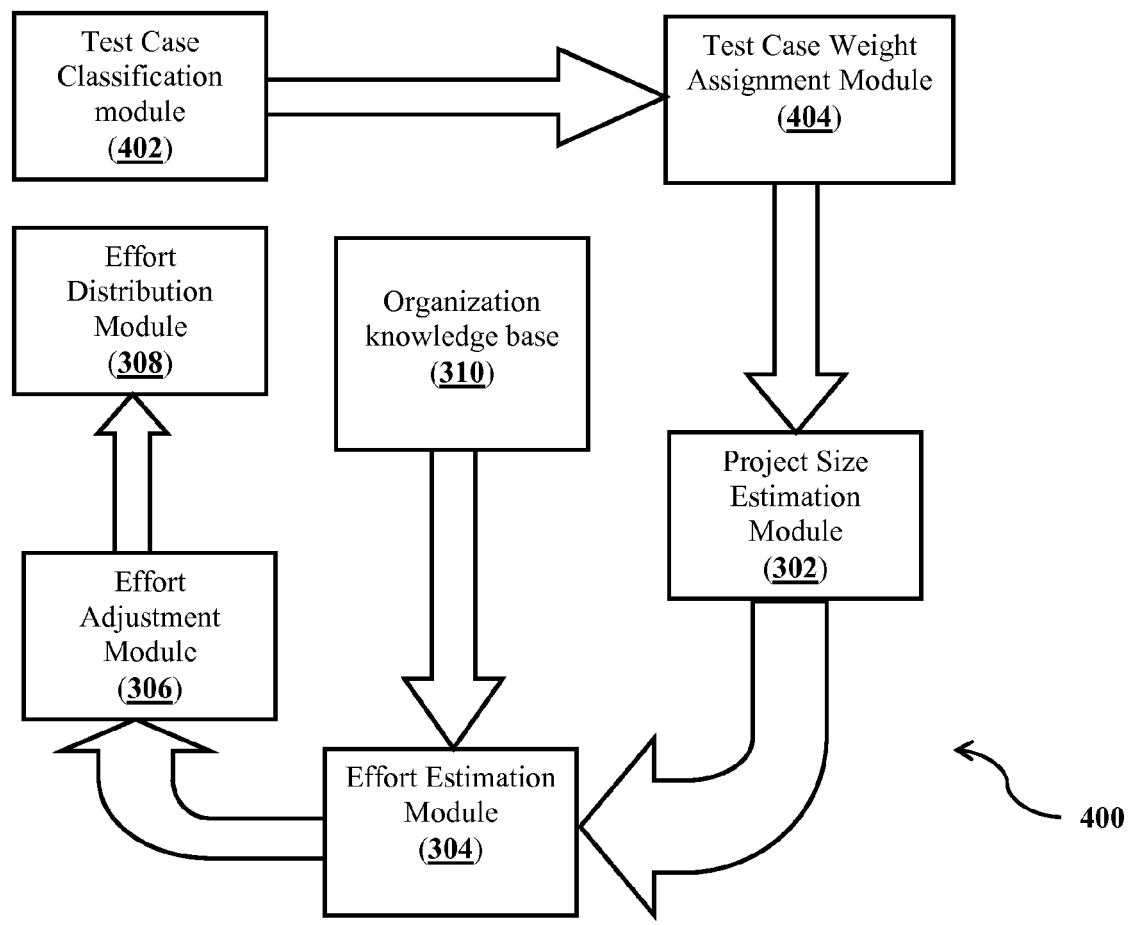
FIG. 4: shows a detailed system diagram illustrating the detailed workflow for estimating size and effort of software assurance project for effort distribution.

Referring to FIG. 4 is a detailed system diagram illustrating the detailed workflow of estimating size and effort of software assurance project for effort distribution.

In an embodiment of the invention, the system (400) for size and effort estimation of software assurance projects for estimated effort distribution across software assurance project phases comprising a test case classification module (402), a test case weight assignment module (404), a project size estimation module (302), an organization knowledge base (310), an effort estimation module (304), an effort adjustment module (306) and an effort distribution module (308).

In an exemplary embodiment of the invention, the test case classification module (402) is adapted to classify the input test cases of the software assurance project into "Simple", "Medium" and "Complex" category on the basis of the number of steps that will have to be executed in order to complete the test case. Wherein, if the number of test steps is upto 10 complexity of the test case is considered to be simple 210, when the number of test steps is in between 11 to 20, the complexity of the test case is considered to be medium 212 and when the number of test steps is in between 21 to 30 complexity of the test case is considered to be complex 214.

In an exemplary embodiment of the present invention, the classification may be based on additional parameters to arrive at the complexity of the test cases. This classification may be relative to the release and project at hand and cannot be standardized across projects. One of the thumb rules which may be applied while classifying is to order the test cases on the basis of complexity, and classify the top 30% most complex requirements as "Complex", middle 40% requirements as "Medium", and bottom 30% requirements as "Simple".

In an exemplary embodiment of the present invention, the testing project may be executed where the set of 400 test cases are already defined. The first consideration made by the current invention may categorize these 400 test cases into SIMPLE, AVERAGE and COMPLEX based on the parameter 'number of steps'.

In an exemplary embodiment, in the second dimension, considering that out of the 400 test cases 200 are SIMPLE, 150 AVERAGE and 50 Complex. This can be depicted as follows:

| Dimension 1 | | |
| --- | --- | --- |
| Simple | Average | Complex |
| 200 | 150 | 50 |

In the second dimension, out of the simple test cases there are 150 that can be used as-is but 50 need modifications. Similarly there are 120 of the average test case that can be reused and 30 that need to be modified, and 40 complex test cases that can be reused and 10 that need changes. Also it is seen that a total of around 50 new test cases need to be created. These 50 test cases are also categorized as simple, average and complex. The final depiction would be:

| | | Dimension 1 | | |
| --- | --- | --- | --- | --- |
| | Complexity | Simple | Average | Complex |
| Dimension 2 | Existing | 150 | 120 | 40 |
| | Needs Modification | 50 | 30 | 10 |
| | New | 30 | 15 | 5 |

Now weight may be assigned to each of the cells across both these dimensions and a final size is arrived at.

For Manual Testing 1:2:3

| Complexity | Simple | Average | Complex |
| --- | --- | --- | --- |
| Existing (0.7) | 150 | 120 | 40 |
| Needs Modification (0.4) | 50 | 30 | 10 |
| New (1) | 30 | 15 | 5 |

In an embodiment of the invention, the test case weight assignment module (404) is adapted to assign the weights for the categorized test cases for a testing project. The weight assigned for simple, average and complex test cases is in the ratio 1:2:3 respectively.

In an embodiment of the invention, the test case weight assignment module (404) is further adapted to assign the weights for the categorized test cases for a manual testing project. The weight assigned for existing manual regression test cases, existing manual regression test cases that are planned to be changed in the current release and new manual test cases planned to be created for the current release is in the ratio 0.7:0.4:1 respectively.

In an embodiment of the invention, the test case weight assignment module (404) is adapted to assign the weights for the categorized test cases for a test automation project. The weight assigned for simple, average and complex test cases is in the ratio 1:2:3 respectively.

In an embodiment of the invention, the test case weight assignment module (404) is further adapted to assign the weights for the categorized test cases for a test automation project. The weight assigned for existing regression test cases, existing regression test cases that are planned to be changed in the current release and new test cases planned to be created for the current release is in the ratio 0.875:0.95:1 respectively.

In an embodiment of the invention, the project size estimation module (302) is adapted to estimate the software assurance project size in terms of Normalized Test Cases.

In an embodiment of the invention, for manual testing projects, the organization knowledge base (312) is adapted to store the organisation's own historical data for projects with similar characteristics for example, technologies, business and tools used, may also be referred to for arriving at the productivity figures for more accurate estimates.

In an exemplary embodiment of the present invention, for test automation projects, organizational baseline productivity (OBP) is based on the automation tool being used; for instance Win Runner, Quality Test Professional or QTP, Rational Functional Tester and the like.

In an exemplary embodiment of the present invention, in case OBP is not available for the testing type (manual testing) or testing tool (automation testing) identified, industry benchmark productivity data (if available) may be used for calculating the base effort.

In an embodiment of the invention, the effort estimation module (304) is adapted for estimating software assurance projects efforts. The estimation of the effort is based on the information received from the project size estimation module (302) and the organization knowledge base (310).

The effort adjustment module (306) is adapted to adjust the derived base effort based on information regarding other effort affecting factors that influence this base effort and result into an adjusted effort.

In an embodiment of the invention, the effort distribution module (308) is adapted to distribute the estimated software assurance project effort the software assurance project phases.

In an exemplary embodiment of the present invention, the phases may be as per the standard testing phases, or they may be customized, based on the project requirements.

In an exemplary embodiment of the present invention, the manual testing projects may be classified into four major phases. The phases may be test planning covering requirement analysis effort; test design covering manual scripting and data preparation effort; test execution covering the core actual test execution effort and the test completion covering analysis and reporting.

In an exemplary embodiment of the present invention, the test automation projects may be classified into four major phases. The phases may be test automation planning covering requirement analysis effort; test automation design covering correction or redesign of test cases and test data setup for automation; test automation construction covering the core construction (script) effort and the test automation execution covering execution, analysis and reporting.

We claim:

1. A method for estimating size and effort of one or more software assurance projects for facilitating effort distribution across a plurality of phases of the software assurance project, the method comprising:
   deriving project size based on a plurality of test steps for a plurality of test cases of software assurance projects using a project size estimation module (302), wherein deriving project size comprises a multi-dimensional approach, wherein the multi-dimensional approach comprises:
      a first dimension for identifying the number of test steps against a predefined guidance, wherein said predefined guidance comprises a definition of test case step, and classifying the plurality of test cases into at least one of a simple, medium and complex category based on the number of test steps;
      a second dimension for further categorizing said test cases, wherein categories comprise existing test cases that can be used as-is, existing test cases that are planned to be modified in the current release, and new test cases planned to be created for the current release; and
      a third dimension for applying a pre-defined weightage across the first dimension and second dimension to express test cases into equivalent normalized test cases;
   estimating project effort of the software assurance project based on the derived size and a baseline productivity using an effort estimation module (304);
   adjusting project effort of the software assurance project based on a plurality of adjustment factors using an effort adjustment module (306); and
   distributing the adjusted effort across the software assurance project phases using an effort distribution module (308).

2. The method according to claim 1, wherein estimating the project size and effort for software assurance projects are applied to at least one of manual test cases and automated test cases.

3. The method according to claim 1, wherein the first dimension comprises determining atomicity of a test case, wherein predefined guidance for said test case comprises complexity of simple, medium and complex, further simple, medium, and complex test cases comprises a plurality of test steps, and execution time for simple, medium, and complex test cases.

4. The method according to claim 3, wherein the test step in the test case is any test step that can be executed with a predefined execution time.

5. The method according to claim 1, wherein the test case complexity is computed as an compartmentalized aggregation of test steps that are a combination of said predefined guidance of complexity comprising of at least one of simple, medium and complex.

6. The method according to claim 1, wherein normalized test cases is determined by applying a specified weight ratio to the classified test cases for existing manual test cases that can used as-is, existing manual test cases that are planned to be changed in the current release and new manual test cases planned to be created for the current release.

7. The method according to claim 1, wherein normalized test cases is determined by applying a specified weight ratio for test automation projects assigned to the classified test cases for existing test cases that can be used as-is, existing test cases that are planned to be changed in the current release and new test cases planned to be created for the current release.

8. The method according to claim 1, wherein a baseline productivity or an organizational baseline productivity (OBP) is derived from an organization knowledge base (310).

9. The method according to claim 1, wherein the baseline effort for the said software assurance project is calculated by dividing number of normalized test cases with productivity in test case per person hour for manual test cases.

10. The method according to claim 1, wherein the baseline effort for the software assurance project is calculated by dividing number of normalized test scripts with productivity in test scripts per person hour for automated test cases.

11. The method according to claim 1, wherein the estimated effort for said software assurance project is further adjusted by compensating the estimated effort using the plurality of adjustment factors selected from a group of a Project Specific factors, a Geography Specific Factors, a Domain Specific Factors, a team's experience on test automation tool training requirements, an additional delays due to test environment setup, a quality of input documentation and integrate Test Scripts with Test Management Tool Scripts.

12. The method according to claim 1, wherein the software assurance project comprises of the phases selected from the group comprising of test planning, test design, test execution and test completion.

13. The method according to claim 7, wherein the size of a test automation project is adjusted on the basis of percentage of automation scripts that may be reused as a result of the framework chosen.

14. A system for estimating size and effort of one or more software assurance project for facilitating effort distribution across a plurality of phases of the software assurance project, the system comprising of:
   a. a test case classification module (402) adapted for classifying a set of test cases of the software assurance project;
   b. a test case weight assignment module (404) adapted for assigning specified weight ratio to classified test cases;
   c. a project size estimation module (302) adapted for estimating project size in size units based on the assigned weight ratio, wherein deriving project size comprises a multi-dimensional approach, wherein the multi-dimensional approach comprises:
      a first dimension for identifying the number of test steps against a predefined guidance, wherein said predefined guidance comprises a definition of test case step, and classifying the plurality of test cases into at least one of a simple, medium and complex category based on the number of test steps;
      a second dimension for further categorizing said test cases, wherein categories comprise existing test cases that can be used as-is, existing test cases that are planned to be modified in the current release, and new test cases planned to be created for the current release; and
      a third dimension for applying a pre-defined weightage across the first dimension and second dimension to express test cases into equivalent normalized test cases;
   d. an effort estimation module (304) adapted for estimating project effort of the software assurance project based on the estimated project size and an organizational baseline productivity (OBP);
   e. an effort adjustment module (306) adapted for adjusting the derived effort based on information regarding other effort affecting factors that influence software assurance projects;

f. an effort distribution module (308) adapted for distributing the estimated effort across the software assurance project phases; and
g. an organization knowledge base (310) adapted for storing information pertaining to the organizational baseline productivity (OBP).

\* \* \* \* \*